C. LE G. FORTESCUE.
ELECTROLYTIC CELL.
APPLICATION FILED APR. 4, 1917.

1,305,458.

Patented June 3, 1919.

WITNESSES:
R. J. Fitzgerald
R. D. Brown

INVENTOR
Charles LeG. Fortescue.
BY
Wesley G. Carr
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTROLYTIC CELL.

1,305,458.  Specification of Letters Patent.  Patented June 3, 1919.

Application filed April 4, 1917. Serial No. 159,659.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Electrolytic Cells, of which the following is a specification.

My invention relates to electrolytic cells such as condensers, rectifiers, lightning arresters and the like, and it has for its objects to provide a form of construction for cells of the character indicated which shall be strong and rigid and which shall have desirable electrical characteristics.

Figure 1:
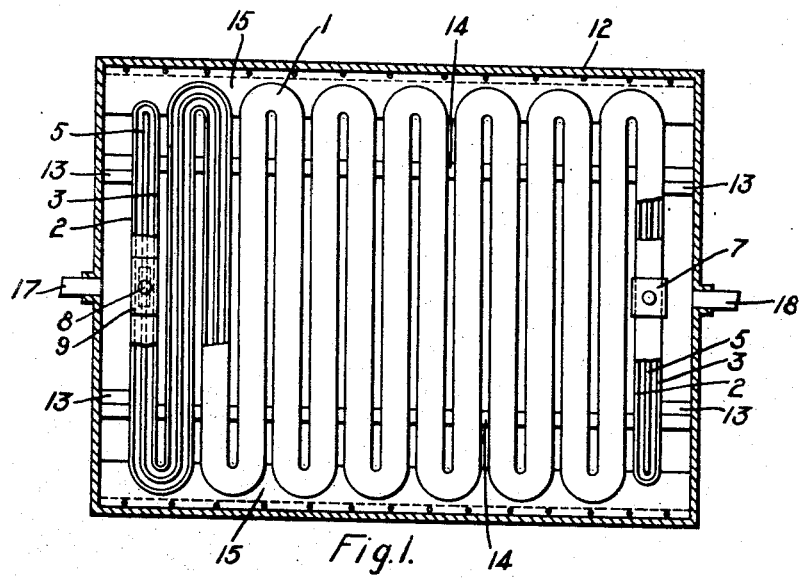
Figure 2:
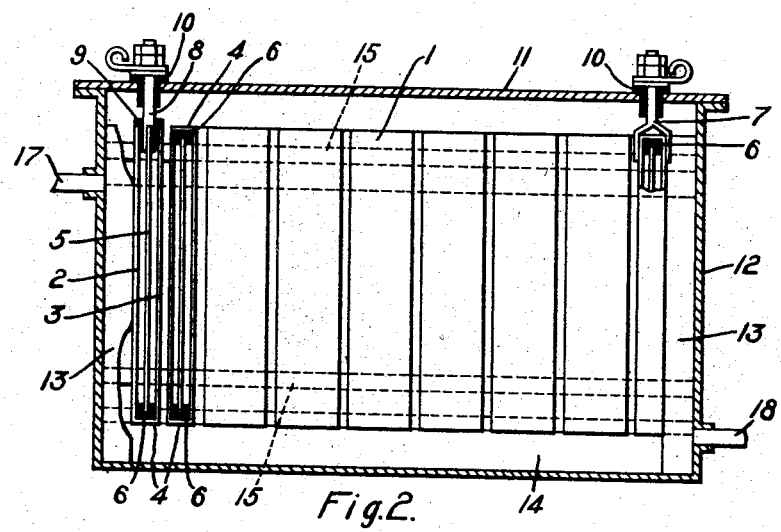

In the accompanying drawing, Figure 1 is a plan view, with parts shown in section and with the cover removed, of an electrolytic cell constructed in accordance with my invention. Fig. 2 is a side view, partially in elevation and partially in vertical section, of the structure shown in Fig. 1.

Electrolytic cells provided with polarizing plates immersed in film-forming electrolytes are frequently required to withstand considerable mechanical shocks and it is therefore desirable that the plate structures be made as rigid as possible. At the same time, it is necessary, in order that the cell may operate effectively, that the electrolyte shall engage as little material as possible other than film-forming metal, and the use of a large number of insulating supports and spacers between the plates is therefore to be avoided. When cells of this character are operated continuously, much heat is developed within the cells and it is therefore necessary to provide means for cooling the electrolyte.

According to my present invention, I provide a strong and rigid construction for cells of the above-indicated character, having the characteristics mentioned and consisting of a long narrow and deep trough or electrolyte container composed of sheet aluminum, magnesium, tantalum or other filming metal and either closed or open at the top. If an entirely closed container is desired, it may conveniently be made by flattening a tube of the filming metal. The container thus formed is flexed upon itself in a number of parallel transverse folds and is placed in any suitable receptacle, which is preferably provided with means for circulating water, air or other cooling fluid around the outer folds of the container. The container is filled with a suitable electrolyte, and a plate of the same material as the container and flexed to conform to its folds is suspended in the electrolyte in such a manner that the plate is spaced at all points from the walls of the container. The container and the plate which it incloses constitute the electrodes of the cell, both sides of the single plate being electrolytically active and provided with asymmetric conducting films, while only the inner sides of the walls of the trough are electrolytically active.

A cell of the construction outlined above is shown in the accompanying drawing, and comprises a flexed electrolyte container 1 of film-forming metal comprising side walls 2 and 3 united at their upper and lower edges by means of strips 4. A plate 5 of the same metal as that composing the container 1 is bent, as shown in Fig. 1, to conform to the convolutions of the trough and may suitably be supported within the container 1 by means of spacing members 6 of porcelain or other suitable insulating material that is chemically inert with respect to the electrolyte employed. A terminal member 7 is attached to any convenient portion of the container 1 and a terminal device 8 is attached to the intermediate plate 5 and extends, for this purpose, through an insulating bushing 9 in the top of the container 1.

Both of the terminal members 7 and 8 extend through bushings 10 in the cover 11 of a receptacle 12 which contains the container 1 with the intermediate plate and terminals. The receptacle 12 may be composed of wood, metal or any other suitable material and the container is supported within the receptacle by means of braces which, as shown, comprise vertical posts 13, to the bottom of which are secured longitudinal supporting bars 14 upon which the container rests. Substantial movement of the several turns of the container is prevented by means of braces 15 secured to the side walls of the receptacle 12 and provided with notches corresponding in outline to the end turns of the convolutions of the container 1.

The receptacle 12 may be provided with a liquid inlet 17 and a liquid outlet 18 by means of which cooling fluid may be circulated through the receptacle for cooling the electrolyte container and its contents. The container 1 and the plate 8 may suitably be composed of sheet aluminum of such thickness that the convolutions of the trough and of the intermediate plate are self-supporting to a considerable degree. Since the walls of the container are of the same polarity, the adjacent convolutions of the trough may be disposed very close together and a large active plate area may therefore be obtained within a small volume and with the use of a small amount of electrolyte, notwithstanding the fact that only the inner wall of the trough is electrolytically active. Numerous other modifications in the structural details which I have shown and described may be effected without exceeding the limits of my invention and it is therefore to be understood that my invention comprehends all such modifications as fall within the scope of the appended claims.

I claim as my invention:

1. An electrolytic cell comprising an elongate electrolyte container having two opposed inner walls of electrode material and an electrode member disposed within the said container and coöperating electrolytically with both of the said container walls.

2. An electrolytic cell comprising an elongate electrolyte container having two opposed inner walls of filming material and an electrode member of filming material disposed within the said container and coöperating electrolytically with both of the said container walls.

3. An electrolytic cell comprising a flexed elongate electrolyte container composed of filming material and an electrode plate of filming material disposed within the said container and spaced from the walls thereof.

4. An electrolytic cell comprising a flexed elongate electrolyte container composed of filming material and an electrode plate of filming material disposed within the said container and spaced from the walls thereof, the said electrode plate being flexed to conform to the shape of the said container.

5. An electrolytic cell comprising an elongate electrolyte container composed of filming material and flexed in a plurality of adjacent and parallel folds, and an electrode plate of filming material disposed within the said container and spaced from the walls thereof, the said electrode plate being flexed to conform to the shape of the said container.

6. An electrolytic cell comprising an outer casing, a flexed elongate electrolyte container composed of filming material and supported within the said casing, and an electrode plate of filming material disposed within the said electrolyte container and spaced from the walls thereof.

7. An electrolytic cell comprising an outer casing, an elongate electrolyte container composed of filming material and flexed in a plurality of adjacent and parallel folds, means for supporting the said container rigidly within the said outer casing, and an electrode plate of filming material disposed within the said electrolyte container and spaced from the walls thereof, the said electrode plate being flexed to conform to the shape of the said container.

8. An electrolytic cell comprising an elongate electrolyte container having two opposed inner walls of electrode material, an electrode member disposed within the said container and coöperating electrolytically with both of the said container walls, and means for applying cooling fluid to the outer walls of the said container.

9. An electrolytic cell comprising an elongate electrolyte container composed of filming material and flexed in a plurality of adjacent and parallel folds, an electrode plate of filming material disposed within the said container and spaced from the walls thereof, the said plate being flexed to conform to the shape of the said container, and means for applying cooling fluid to the outer walls of the said container.

10. An electrolytic cell comprising an outer casing, a flexed, elongate electrolyte container composed of filming material and supported within the said casing, an electrode plate of filming material disposed within the said electrolyte container and spaced from the walls thereof, and means for passing cooling fluid through the said outer casing.

11. An electrolytic cell comprising an outer casing, an elongate electrolyte container composed of filming material supported within the said casing and flexed in a plurality of adjacent and parallel vertical folds, the said container consisting of two spaced vertical walls connected at their lower edges, an electrode plate of filming material disposed within the said container and spaced from the walls thereof to coöperate electrolytically with both of the said vertical walls, the said plate being flexed to conform to the shape of the said container, and means for passing cooling fluid through the said outer casing.

12. An electrolytic cell comprising a flattened tubular closed container of film-forming material, an electrode of film-forming material extending throughout the length of the container and an electrolyte inclosed in the container.

In testimony whereof, I have hereunto subscribed my name this 3d day of April, 1917.

CHARLES LE G. FORTESCUE.